United States Patent [19]

Belluomini

[11] Patent Number: 4,899,694

[45] Date of Patent: Feb. 13, 1990

[54] ANIMAL RESTRAINT

[76] Inventor: Michael B. Belluomini, 120 Dover Ct., Santa Rosa, Calif. 95403

[21] Appl. No.: 284,901

[22] Filed: Dec. 15, 1988

[51] Int. Cl.[4] .................... A01K 1/00

[52] U.S. Cl. .................... 119/109

[58] Field of Search .................... 119/96, 109, 120; 54/34; 410/145, 146, 151; 211/17, 175

[56] References Cited

U.S. PATENT DOCUMENTS

| | | | |
|---|---|---|---|
| 225,404 | 3/1880 | Maxey | 119/120 |
| 1,891,588 | 12/1932 | Claus | 410/151 |
| 1,951,660 | 3/1934 | Klaudt | 410/145 X |
| 4,023,819 | 5/1977 | Holman, Jr. | 410/151 |
| 4,252,084 | 2/1981 | Willow | 119/96 |
| 4,737,056 | 4/1988 | Hunt | 410/151 |
| 4,791,886 | 12/1988 | Anderson | 119/120 |
| 4,797,043 | 1/1989 | Williams, Jr. | 410/151 X |

*Primary Examiner*—Gene Mancene
*Assistant Examiner*—R. Thomas Price
*Attorney, Agent, or Firm*—Larry D. Johnson

[57] ABSTRACT

An animal restraint to securely restrain an animal in a truck bed having bed side walls comprises an elongate threaded rod of a length somewhat less than the distance between the truck bed side walls, terminating in two side attachment portions for connection to the side walls. These side attachment portions each enable length adjustment so that the system can be adjusted to fit in various widths of truck beds. A restraint centering device serves to secure a swivel member at some point along the length of the threaded rod. A restraint lead is connected, as by a clamp, to this centering device swivel member, and terminates in a snap or fastener attachable to an animal collar. Therefore, an animal attached to the restraint lead snap is prevented from reaching either truck bed side wall.

3 Claims, 1 Drawing Sheet

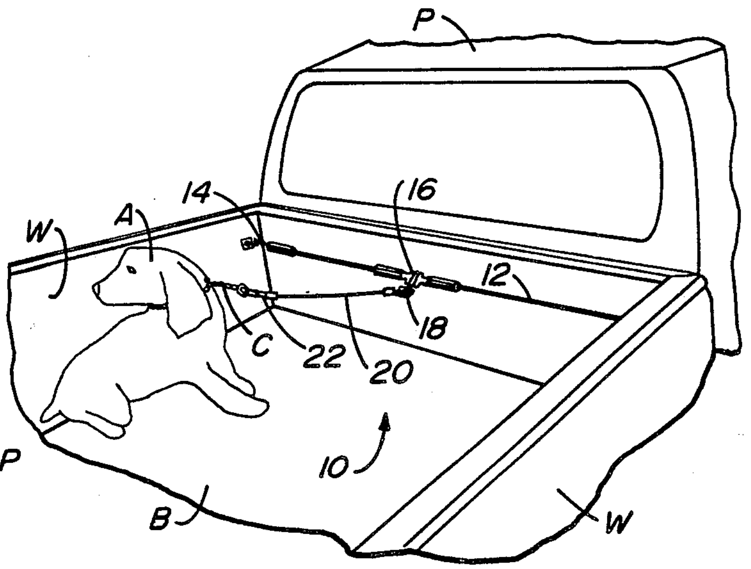
FIG._1
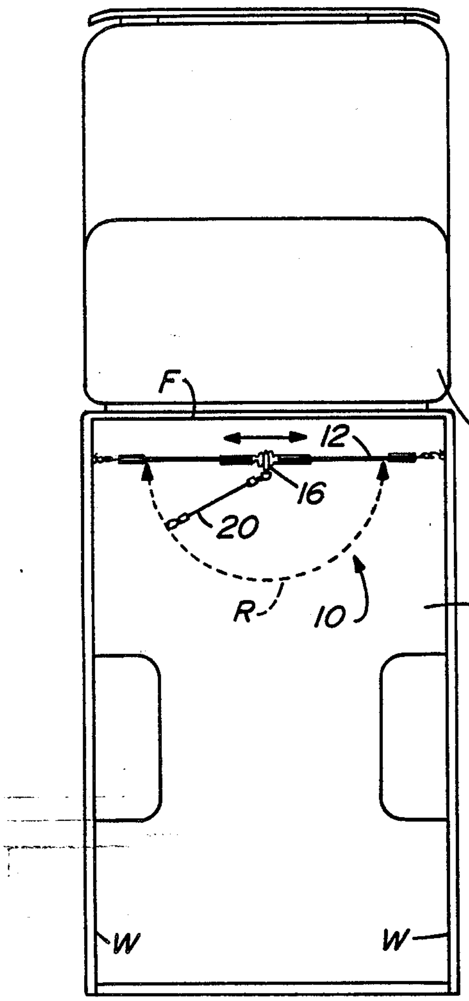
FIG._2
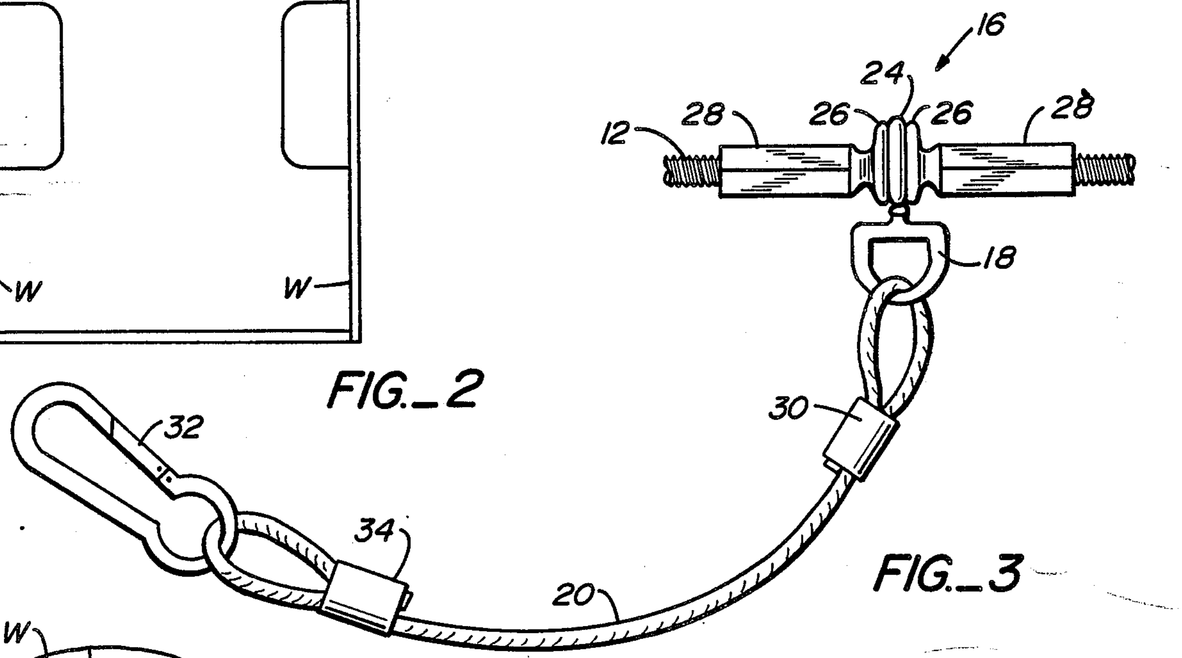
FIG._3
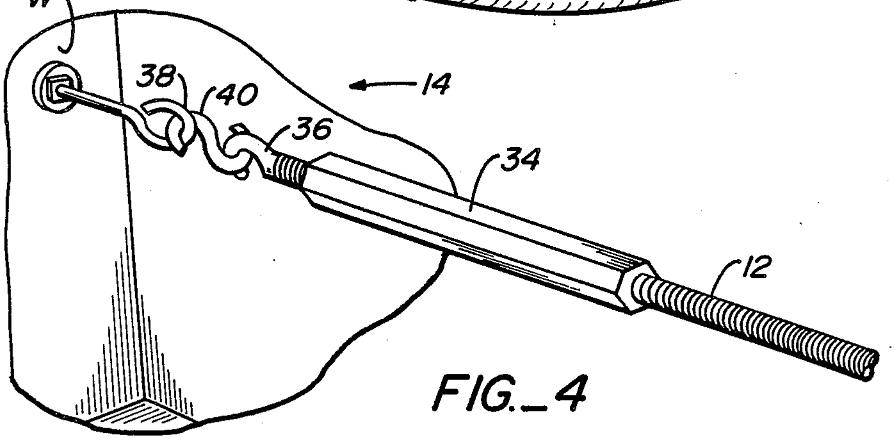
FIG._4

ANIMAL RESTRAINT

BACKGROUND OF THE INVENTION

1. This invention relates generally to cables, leashes, and related restraint devices, and more specifically to an improved animal restraint device for use in pickup trucks and other vehicles.

2. Description of the Prior Art

Many pet and animal owners transport their animals in trucks, especially open-bed type pickup trucks. If left unrestrained, however, the animal may jump or fall out of the truck bed while the vehicle is under way, especially during acceleration, deceleration or on turns. Indeed, many state vehicle laws now require some form of restraint for animals which are carried in a truck bed, both to avoid dangerous traffic situations and to prevent injury to the animals.

Thus, many animal owners choose to tie their animal into the truck bed, usually by a length of rope. Unfortunately, an improperly installed rope may still enable the animal to fall over the truck bed side walls, dangerously hanging or dragging the animal. In addition, most truck beds are not readily fitted with such a rope or other restraint, thus hindering the ability of the owner to transport their animals.

SUMMARY OF THE INVENTION

The animal restraint of this invention provides an easily installed and adjustable system to securely restrain an animal in a truck bed having bed side walls. The system comprises an elongate threaded rod of a length somewhat less than the distance between the truck bed side walls, terminating in two side attachment portions for connection to the side walls. These side attachment portions each include a means for length adjustment, such as a turnbuckle and a threaded hook attachable to a receiving eyelet on the truck bed side wall, so that the system can be adjusted to fit in various widths of truck beds.

A restraint centering device serves to secure a swivel member at some point along the length of the threaded rod (typically near the center of the rod, and thus near the center of the truck bed). This centering device may comprise a swivel eye mounted on the rod, captured between a pair of grommets, themselves captured between a pair of adjusting nuts, so that the nuts can be moved along the length of the rod and tightened at a desired point to secure the swivel member in place.

A restraint lead is connected, as by a clamp, to this centering device swivel member, and terminates in a snap or fastener attachable to an animal collar. The length of the lead is generally determined by the width of the truck bed, but is typically on the order of one-half of the length of the threaded rod, and thus less than one-half of the distance between the truck bed side walls. Therefore, an animal attached to the restraint lead snap is prevented from reaching (or falling over) either truck bed side wall, thereby enabling safe animal transport.

BRIEF DESCRIPTION OF THE DRAWINGS

FIG. 1 is a partially cutaway perspective view of a portion of a typical pickup truck and truck bed, illustrating an animal securely restrained in the truck bed by the animal restraint system of this invention;

FIG. 2 is a top plan view of a pickup truck and truck bed, with the animal restraint system of this invention installed between the two truck bed side walls and near the truck bed front wall, and illustrating the limited range of motion of the restraint lead;

FIG. 3 is a top plan view of the restraint lead and centering device portions of the animal restraint system of this invention; and FIG. 4 is a partially cutaway perspective view of the adjustable side attachment portion of the animal restraint of this invention.

DETAILED DESCRIPTION OF A PREFERRED EMBODIMENT

FIG. 1 is a partially cutaway perspective view of a portion of a typical pickup truck P and truck bed B, illustrating an animal A securely restrained in the truck bed by the animal restraint system 10 of this invention. Restraint system 10 comprises an elongate threaded rod 12 of a length somewhat less than the distance between the truck bed side walls W, terminating in two side attachment portions 14 for connection to the side walls. A restraint centering device 16 serves to secure a swivel member 18 at some point along the length of the threaded rod 12. A restraint lead 20 is connected to swivel 18, and terminates in a snap 22 attachable to an animal collar C.

FIG. 2 is a top plan view of a pickup truck P and truck bed B, with the animal restraint system 10 installed between the two truck bed side walls W and near the truck bed front wall F, and illustrating the limited range of motion R of the restraint lead 20. This view illustrates that by proper adjustment, the length of lead 20 prevents an animal attached to the lead from falling over either side wall W. This view further illustrates that restraint centering device 16 is laterally adjustable along the length of threaded rod 12, to enable the user to adjust the focus of the range of motion R. This could be useful, for example, to restrict an animal to one side or another of the truck bed, but still give the animal some freedom of movement.

FIG. 3 is a top plan view of the restraint lead 20 and centering device 16 portions of the animal restraint system. Centering device 16 comprises swivel 18 mounted on threaded rod 12. Swivel eye 24 is captured between a pair of grommets 26, which are themselves captured between a pair of adjusting nuts 28, so that the nuts can be moved along the length of the rod and tighted together at a desired point on the rod to secure the centering device, and thus the swivel, in place.

Restraint lead 20 comprises a segment of rope, cable, or similar material of a length generally one-half the length of the threaded rod. Lead 20 is connected to swivel 18 via clamp 30, which may be adjustable to enable length adjustment of lead 20. The remote end of lead 20 is connected to snap or fastener 32 via clamp 34, which may similarly be adjustable.

FIG. 4 is a partially cutaway perspective view of the adjustable side attachment portion 14 of the animal restraint system. Attachment portion 14 may include a means for length adjustment, such as turnbuckle 34 and threaded hook 36 attachable to a receiving eyelet 38 on the truck bed side wall. S-hook 40 may be inserted between hook 36 and eyelet 38 to enable easier engagement/disengagement of the threaded rod to the side wall.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. An animal restraint device for installation in a truck bed having bed side walls, said side walls separated by a first distance, said restraint device comprising:

an elongate rod member comprising a treaded rod, said rod member having a length less than said first distance, said rod member terminating in two ends;

a side attachment portion carried on each of said rod members ends, said side attachment portions conditioned for releasable engagement to said truck bed side walls;

a restraint centering device comprising an adjusting nut mounted on said rod and selectively movable and securable along said rod length; and a restraint lead connected to said centering device, said lead having a length generally one-half of said rod member length, said lead terminating in a fastener member conditioned for attachment to an animal collar.

2. The animal restraint device of claim 1 wherein said side attachment portion comprises a threaded turnbuckle and hook member conditioned to engage a receiving eyelet carried on said bed side walls.

3. The animal restraint device of claim 2 wherein said restraint lead includes adjustment means for changing said restraint lead length.

* * * * *